(12) United States Patent
Swanson

(10) Patent No.: US 11,375,865 B2
(45) Date of Patent: Jul. 5, 2022

(54) WASTE VIEWING DISPOSAL CONTAINER SYSTEM AND METHOD(S) OF USE THEREOF

(71) Applicant: James A. Swanson, Centennial, CO (US)

(72) Inventor: James A. Swanson, Centennial, CO (US)

( * ) Notice: Subject to any disclaimer, the term of this patent is extended or adjusted under 35 U.S.C. 154(b) by 247 days.

(21) Appl. No.: 16/734,622

(22) Filed: Jan. 6, 2020

(65) Prior Publication Data

US 2020/0221916 A1 Jul. 16, 2020

Related U.S. Application Data

(60) Provisional application No. 62/791,529, filed on Jan. 11, 2019.

(51) Int. Cl.
*A47L 11/34* (2006.01)
*A47L 11/40* (2006.01)
*B60P 3/14* (2006.01)

(52) U.S. Cl.
CPC ........... *A47L 11/34* (2013.01); *A47L 11/4083* (2013.01); *A47L 11/4044* (2013.01); *A47L 11/4088* (2013.01); *B01D 2279/55* (2013.01); *B60P 3/14* (2013.01)

(58) Field of Classification Search
CPC .. A47L 11/34; A47L 11/4083; A47L 11/4044; A47L 11/4088; A47L 11/4016; B01D 2279/55; B60P 3/14
See application file for complete search history.

(56) References Cited

U.S. PATENT DOCUMENTS

| | | | | |
|---|---|---|---|---|
| 2,094,916 A | * | 10/1937 | Delano | F01M 11/04 134/107 |
| 2,477,404 A | * | 7/1949 | Butt, Jr. | B01D 29/055 |
| 3,619,849 A | * | 11/1971 | Jones | A47L 11/4088 15/321 |
| 4,080,104 A | * | 3/1978 | Brown, Jr. | A47L 7/0028 15/353 |
| 4,244,079 A | * | 1/1981 | Bane | A47L 11/34 15/315 |
| 4,443,909 A | | 4/1984 | Cameron | |

(Continued)

FOREIGN PATENT DOCUMENTS

| | | |
|---|---|---|
| CN | 105106995 | 1/2018 |
| EP | 2755541 | 11/2016 |

(Continued)

OTHER PUBLICATIONS

Colder Products Company. "An Introduction to Hose Barbed Fittings" (2007). Brookhaven National Laboratory. (Year: 2007).*

*Primary Examiner* — David Redding
(74) *Attorney, Agent, or Firm* — Leyendecker & Lemire, LLC

(57) ABSTRACT

A waste viewing disposal container system is described. Embodiments of the waste viewing disposal container system can include a waste viewing disposal container operatively connected to a truckmount carpet cleaner unit. The waste viewing disposal container can be configured to store waste collected by the truckmount carpet cleaner unit for visual inspection of the waste by an operator during use of the truckmount carpet cleaner unit.

20 Claims, 4 Drawing Sheets

(56) References Cited

U.S. PATENT DOCUMENTS

| | | | | |
|---|---|---|---|---|
| 4,800,612 A | * | 1/1989 | Valentine | A47L 11/34 |
| | | | | 15/314 |
| 4,949,424 A | | 8/1990 | Shero | |
| 5,447,663 A | * | 9/1995 | Dix | F24F 6/00 |
| | | | | 261/142 |
| 5,898,970 A | * | 5/1999 | Straiton | B05B 1/28 |
| | | | | 15/321 |
| 5,967,198 A | * | 10/1999 | Smalley | B60S 5/046 |
| | | | | 141/94 |
| 5,985,009 A | * | 11/1999 | Marsala | A47L 5/38 |
| | | | | 15/353 |
| 6,513,187 B1 | * | 2/2003 | Naseth, Sr. | A47L 5/38 |
| | | | | 137/205 |
| 2013/0205533 A1 | | 8/2013 | Durrant | |

FOREIGN PATENT DOCUMENTS

| | | | | |
|---|---|---|---|---|
| JP | 2007236571 | | 9/2007 | |
| WO | WO-2005032735 A2 | * | 4/2005 | ......... A47L 11/4083 |

* cited by examiner

WASTE VIEWING DISPOSAL CONTAINER SYSTEM AND METHOD(S) OF USE THEREOF

CROSS-REFERENCE TO RELATED APPLICATION

This application claims the benefit of U.S. Provisional Application No. 62/791,529, filed Jan. 11, 2019.

BACKGROUND

Traditionally, carpet cleaning services that operate from a van or truck include a waste container located in the van or truck. As can be appreciated, this allows for a worker to only need to take hoses into a home or business to start cleaning. However, while the worker is cleaning, they have no way of readily knowing if a proper amount of chemicals is being used while cleaning. This can lead to the carpets not being properly cleaned, or alternatively, the worker may be wasting chemicals as too much is being used.

A means for viewing waste as it is being collected for easy analysis by a cleaner is needed.

DETAILED DESCRIPTION

Figure 1:
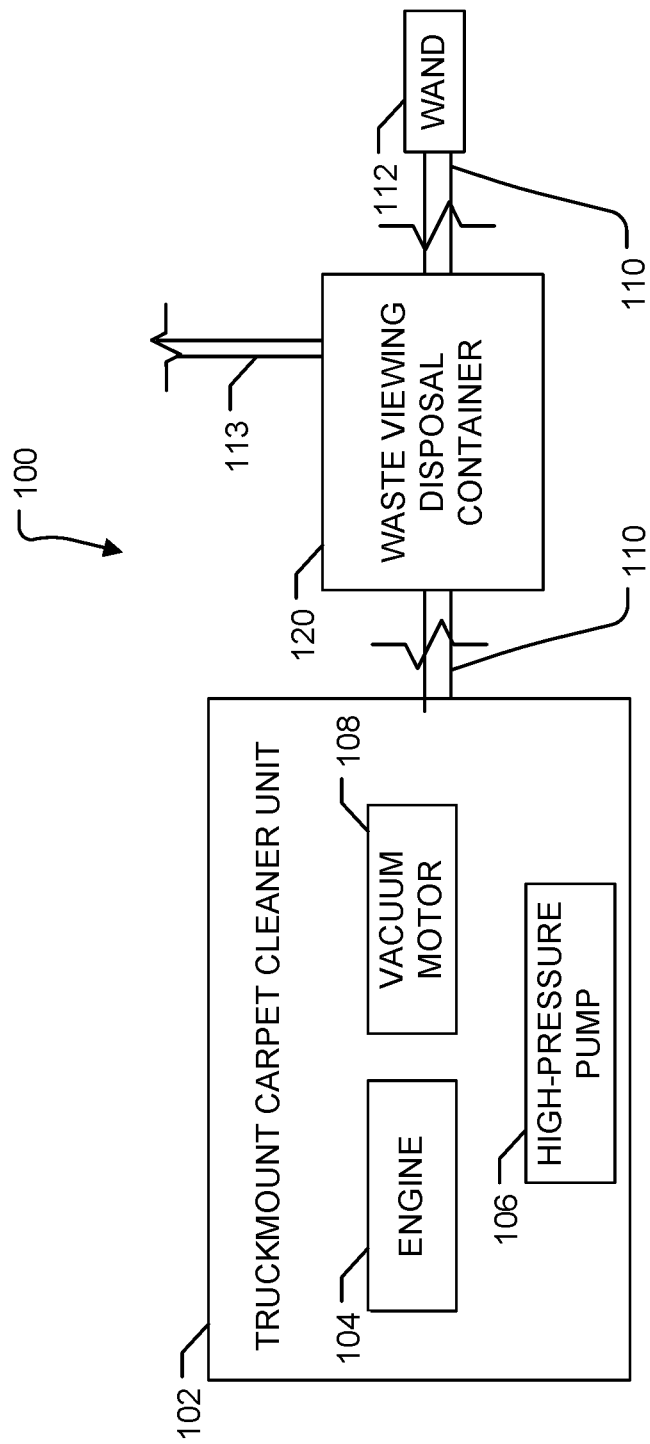
FIG. 1 is a block diagram of a waste viewing disposal container system according to one embodiment of the present invention.

Embodiments of the present invention include a waste viewing disposal container system and method(s) of use thereof. The waste viewing disposal container system can include, but is not limited to, a truckmount carpet cleaner unit in combination with a waste viewing disposal container. The truckmount carpet cleaner unit can typically include an engine, a high-pressure pump, a vacuum motor, two or more hoses, and a wand. The waste viewing disposal container can include, but is not limited to, a transparent container including a plurality of inlets/outlets, a submersible pump, and a filter.

The waste viewing disposal container can typically be implemented with the truckmount carpet cleaner unit. The waste viewing disposal container can be placed between the wand and the vacuum of the truckmount carpet cleaner unit. Generally, at least one of the two or more hoses can be connected between the truckmount carpet cleaner unit and a first port of the container. At least a second one of the two or more hoses can be connected between a second port of the container and the wand of the truckmount carpet cleaner unit. The submersible pump can be implemented to pump water and debris (e.g., waste) from the container through a third port.

In a typical implementation, the waste viewing disposal container can be implemented to allow a user to view waste being vacuumed up while cleaning carpet and/or upholstery. For instance, as a user is using the truckmount carpet cleaner unit, any debris, dirt, etc. including water can be vacuumed up and sucked into the container. As can be appreciated, since the container is transparent, the user may see what is being vacuumed up. The container can include the submersible pump to allow for the waste to be discarded from the container to an appropriate dump site. Typically, a hose can be connected to the third port and an end of the hose may be placed proximate the appropriate dump site (e.g., sink, garden, toilet, etc.).

In one example embodiment, the waste viewing disposal container system can include, but is not limited to, a truckmount carpet cleaner unit, a waste viewing disposal container, and a wand. As previously mentioned, the waste viewing disposal container can be an intermediary between a vacuum of the truckmount carpet cleaner unit and the wand. As can be appreciated, as the wand picks up water and debris from carpet and/or upholstery, the waste can be collected in the waste viewing disposal container. Hoses of the truckmount carpet cleaner unit can be implemented to connect the waste viewing disposal container to the vacuum of the truckmount carpet cleaner unit. Of significant note, although a truckmount carpet cleaner unit is described, the waste viewing disposal container can be connected to most industrial vacuum systems.

The waste viewing disposal container can be manufactured from a substantially rigid and transparent material. For instance, plexiglass may be implemented to manufacture the container. In most implementations, a substantially transparent rigid plastic or polymer may be used to manufacture the container. Typically, the ports of the container can include a gasket or similar device for keeping the container airtight. Since the container is an intermediary between the vacuum of the truckmount carpet cleaner unit and the wand, suction from the vacuum needs to be sustained to allow for the wand to pick up water and debris. As such, the container can be manufactured to minimize or eliminate leaks from the container.

The waste viewing disposal container can include, but is not limited to, a substantially transparent container, a submersible pump, a first port, a second port, and a third port. In some embodiments, the container may further include a filter.

The submersible pump can be implemented to pump waste from the container out of the container to a location determined by a user to be appropriate to dump the waste. Tubing may run from the submersible pump out of the container through the third port. The third port can be sealed such that air will not escape the container via the third port. In some embodiments, the submersible pump may be configured to pump waste from the container based on a level of the waste in the container. For instance, if the waste reaches a predetermined height in the container, the submersible pump may automatically turn on and run for a predetermined amount of time to remove waste from the container. In another instance, the submersible pump may be manually started and stopped by a user.

Typically, each of the ports may include attachment members for attaching to various components of the system. For instance, the first port and the second port may each include a barbed member for attaching to a hose of the truckmount carpet cleaner unit. The third port may include an appropriate fitting for attaching to a hose to dispose of the contents of the container. As previously mentioned, each of the attachment members may be coupled to the container such that air will not leak out from the ports.

The ports can typically be located towards an upper portion of the container. This can help ensure that pressure from the vacuum can flow from the second port to the first port. In some embodiments, the first port may be located at a predetermined height from the bottom of the container to allow the contents of the container to exit the third port when reaching a threshold. This would allow a user to view the waste being collected while still allowing for the waste to be pumped out by the submersible pump. The second port can include a filter in an interior of the container to filter waste coming from the wand.

In one embodiment, a waste viewing disposal container can be adapted to be integrated with a truckmount carpet cleaner unit. The waste viewing disposal container can include, but is not limited to, a container being manufactured from a substantially rigid and transparent material, a first port adapted to couple to a first hose, the first hose connected to a vacuum of the truckmount carpet cleaner unit, a second port adapted to couple to a second hose, the second hose coupled to a wand, a third port, and a submersible pump operatively connected to the third port for removing waste from the container. The container may further include a lid. The submersible pump can include a float switch. A filter can be located proximate the second port and inside the container. A waste hose can be coupled to the third port and be located outside the container. The container can be configured to maintain vacuum pressure when a vacuum motor of the truckmount carpet cleaner unit is activated. Waste can be deposited into the container via the second port. The first port can be located on an opposing side of the container from the second port. The first port and the second port can be located approximate an upper ⅓ of the container. The container can further include a relief valve.

In another embodiment, a combination including a truckmount carpet cleaner unit and a waste viewing disposal container can be implemented. The truckmount carpet cleaner unit can include, but is not limited to, an engine, a vacuum motor, a first vacuum hose, a second vacuum hose, and a wand coupled to the second vacuum hose. The waste viewing disposal container can be operatively connected to the truckmount carpet cleaner unit. The waste viewing disposal container can include, but is not limited to, a container manufactured from a substantially rigid and transparent material, a first port coupled to the first vacuum hose, a second port coupled to the second vacuum hose, a third port, and a submersible pump operatively connected to the third port for removing waste from the container. The truckmount carpet cleaner unit can be adapted to be located inside a vehicle and the waste viewing disposal container can be adapted to be located inside a structure when being used. Vacuum pressure can be substantially maintained inside the waste viewing disposal container when the vacuum motor is operating. The first port and the second port can each include a hose adapter having a barbed end located outside the container and a tube elbow for a second end located inside the container. The tube elbow of the first port hose adapter can be oriented upwards and the tube elbow of the second port hose adapter can be oriented downwards. The combination can further include a filter coupled to the tube elbow of the second port hose adapter.

In yet another embodiment, a combination including a truckmount carpet cleaner adapted to be stored in a vehicle and a waste viewing disposal container operatively connected to the truckmount carpet cleaner unit can be implemented. The waste viewing disposal container can be adapted to be located inside a structure being cleaned. The truckmount carpet cleaner unit can include, but is not limited to, an engine, a vacuum motor, a first vacuum hose, a second vacuum hose, and a wand coupled to the second vacuum hose. The waste viewing disposal container can include, but is not limited to, a container being manufactured from a substantially rigid and transparent material, a first port coupled to the first vacuum hose, a second port coupled to the second vacuum hose, a third port including a hose connector, and a submersible pump operatively connected to the hose connector for removing waste from the container.

Terminology

The terms and phrases as indicated in quotation marks (" ") in this section are intended to have the meaning ascribed to them in this Terminology section applied to them throughout this document, including in the claims, unless clearly indicated otherwise in context. Further, as applicable, the stated definitions are to apply, regardless of the word or phrase's case, to the singular and plural variations of the defined word or phrase.

The term "or" as used in this specification and the appended claims is not meant to be exclusive; rather the term is inclusive, meaning either or both.

References in the specification to "one embodiment", "an embodiment", "another embodiment, "a preferred embodiment", "an alternative embodiment", "one variation", "a variation" and similar phrases mean that a particular feature, structure, or characteristic described in connection with the embodiment or variation, is included in at least an embodiment or variation of the invention. The phrase "in one embodiment", "in one variation" or similar phrases, as used in various places in the specification, are not necessarily meant to refer to the same embodiment or the same variation.

The term "couple" or "coupled" as used in this specification and appended claims refers to an indirect or direct physical connection between the identified elements, components, or objects. Often the manner of the coupling will be related specifically to the manner in which the two coupled elements interact.

The term "directly coupled" or "coupled directly," as used in this specification and appended claims, refers to a physical connection between identified elements, components, or objects, in which no other element, component, or object resides between those identified as being directly coupled.

The term "approximately," as used in this specification and appended claims, refers to plus or minus 10% of the value given.

The term "about," as used in this specification and appended claims, refers to plus or minus 20% of the value given.

The terms "generally" and "substantially," as used in this specification and appended claims, mean mostly, or for the most part.

Directional and/or relationary terms such as, but not limited to, left, right, nadir, apex, top, bottom, vertical, horizontal, back, front and lateral are relative to each other and are dependent on the specific orientation of a applicable element or article, and are used accordingly to aid in the description of the various embodiments and are not necessarily intended to be construed as limiting.

An Embodiment of a Waste Viewing Disposal Container System

Referring to FIG. 1, a block diagram of an embodiment 100 of a waste viewing disposal container (WVDC) system is illustrated. The WVDC system 100 can include a waste viewing disposal container 120 in combination with a truckmount carpet cleaner unit 102. Of note, the waste viewing disposal container 120 can be used with different truckmount carpet cleaner units. Generally, the waste viewing disposal container 120 can take the place of an existing waste container of the truckmount carpet cleaner unit 102.

As shown, the WVDC system 100 can include the waste viewing disposal container 120 operatively connected to the truckmount carpet cleaner unit 102. The truckmount carpet cleaner unit 102 can typically include, but is not limited to, an engine 104, a high-pressure pump 106, a vacuum motor 108, two or more hoses 110, and a wand 112. As shown, a first hose 110 can be connected between the truckmount carpet cleaner unit 102 and the container 120 and a second hose 110 can be connected between the container 120 and the wand 112.

As previously noted, the truckmount carpet cleaner unit 102 can be implemented to collect waste when cleaning carpets. Usually, the engine 104 can power the high-pressure pump 106 and the vacuum motor 108. The high-pressure pump 106 can send liquid cleaning agents and/or water to an area being cleaned. The vacuum motor 108 can create a vacuum in the hose 110 which can include the wand 112 to suck-up waste as a user is cleaning a carpet. Typically, the hose 110 can be connected to a waste container located on a vehicle the truckmount carpet cleaner unit 102 is coupled to. As such, all the waste is collected by the cleaner unit 102 and transported to another location to be disposed of. While cleaning, a user has to rely upon their settings to ensure that the proper amount of water and cleaning agents are applied to the carpet without being able to view the results of the cleaning in real time. This can lead to cleaning agents being wasted as too much is being used or alternatively not enough cleaning agents are being used and the carpets are not properly cleaned. The container 120 can allow the user to view the waste as it is collected and make determinations on if the cleaning agents are being properly utilized.

Figure 2A:
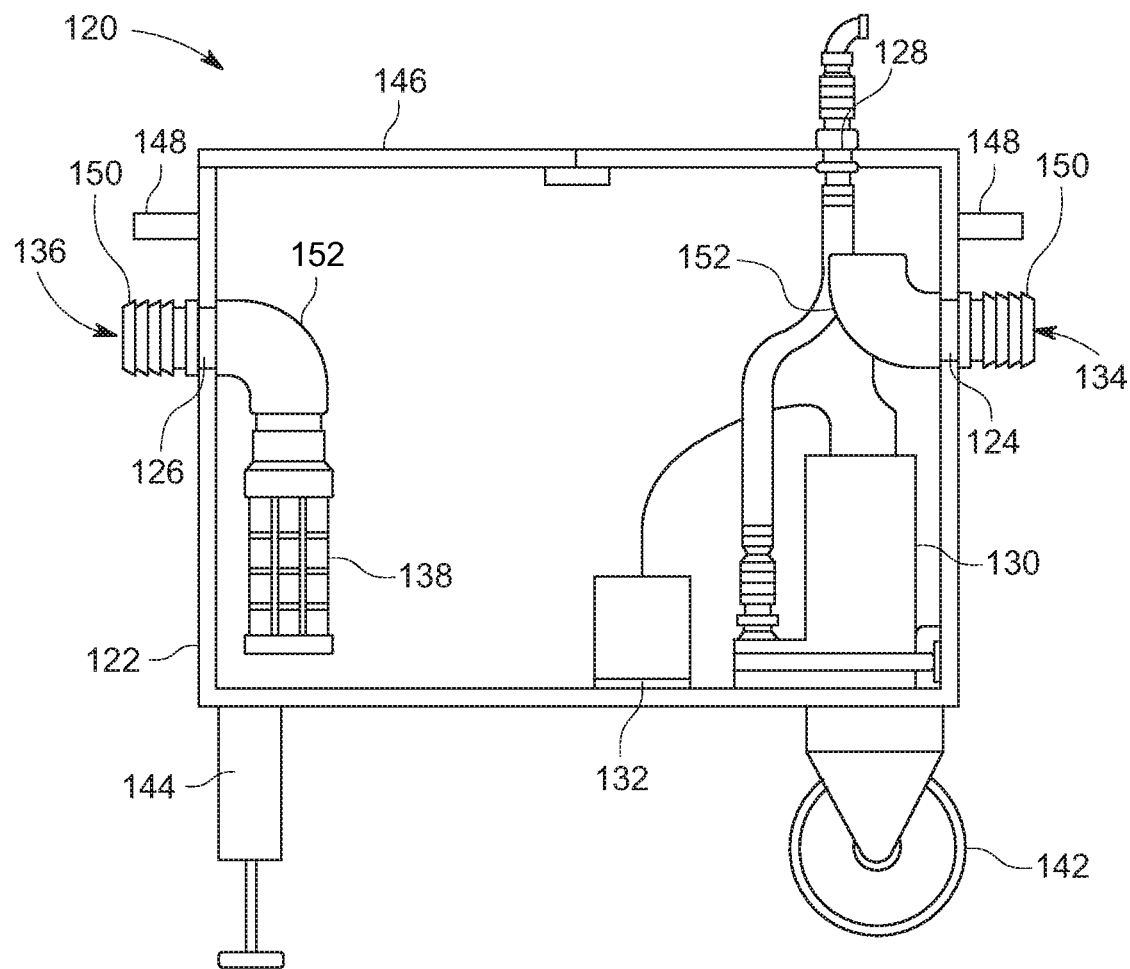
FIG. 2A is a side view of a waste viewing disposal container according to one embodiment of the present invention.
Figure 2B:
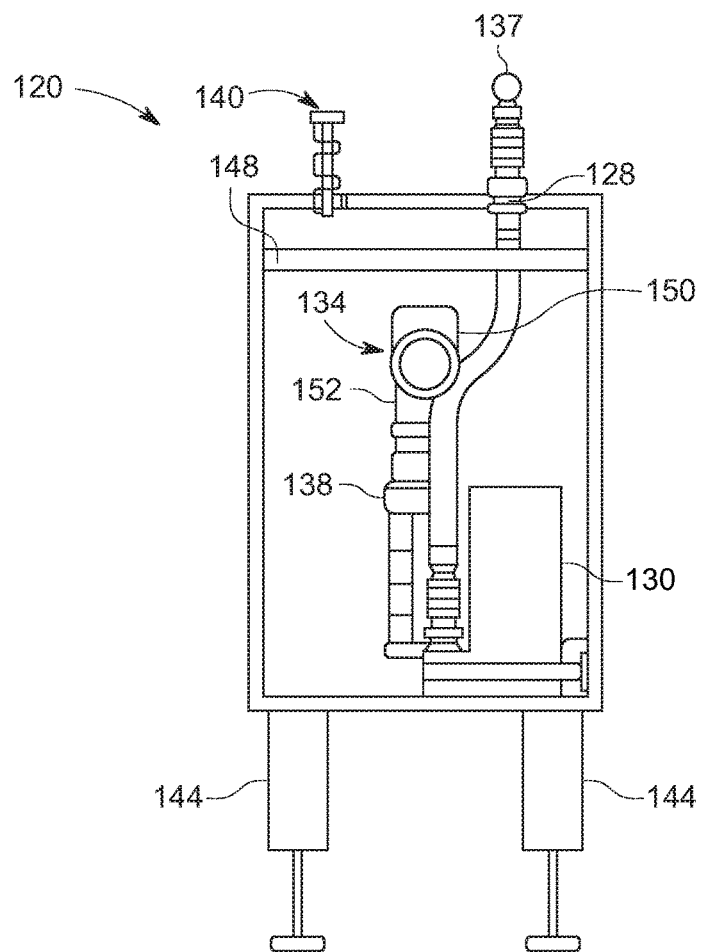
FIG. 2B is a front view of a waste viewing disposal container according to one embodiment of the present invention.
Figure 2C:
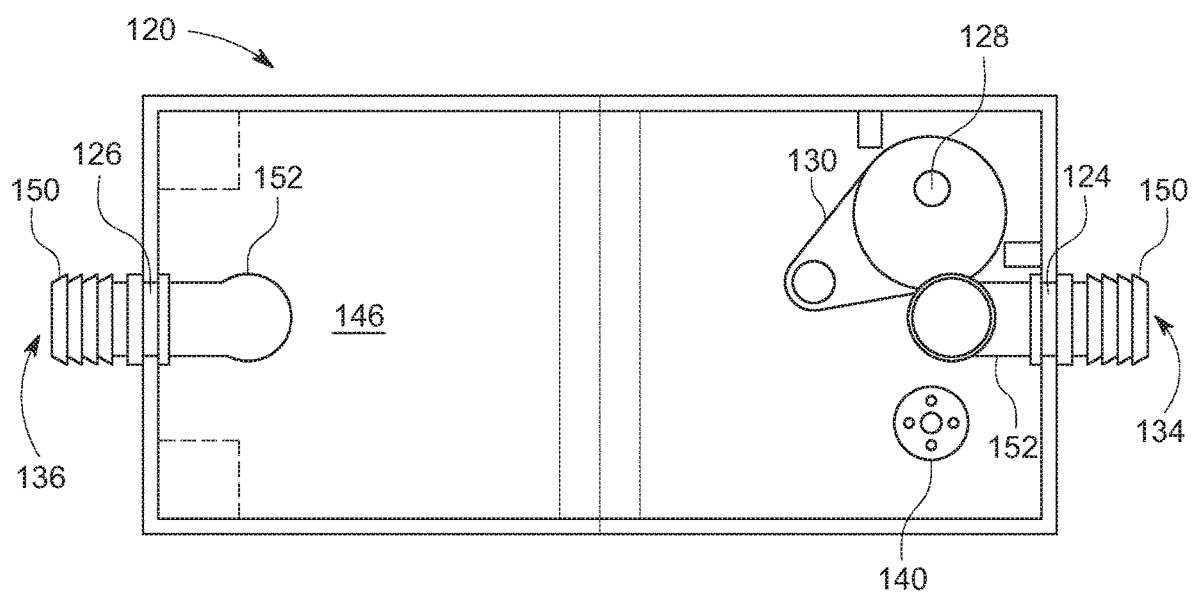
FIG. 2C is top view of a waste viewing disposal container according to one embodiment of the present invention.

Referring generally to FIGS. 2A-2C, a side view, a front view, and a top view of one embodiment of the waste viewing disposal container 120 are illustrated. As shown, the waste viewing disposal container 120 can include, but is not limited to, a container 122, a first port 124, a second port 126, a third port 128, a submersible pump 130, a float switch 132, a first hose adapter 134, a second hose adapter 136, a third hose adapter 137, a filter 138, a pressure release valve 140, and one or more handles 148. In one embodiment, the container 122 may include a pair of casters 142 and a pair of adjustable legs 144. It is to be appreciated that the container 120 may include four legs that are not adjustable. Of note, by implementing adjustable legs, the container 120 can be leveled on a floor in a home that may not be perfectly level.

The first port 124 and the second port 126 can include the first hose adapter 134 and the second hose adapter 136, respectively. In one instance, the first hose adapter 134 and the second hose adapter 136 can include barbed adapters and elbows. The barbed adapters can be implemented to couple to the hoses 110. As shown, the elbow of the first hose adapter 134 can be implemented to orient an intake of the adapter 134 upwards such that the first hose adapter 134 does not intake waste from the container 120. The elbow of the second hose adapter 136 can be implemented to orient an exhaust of the adapter 136 downwards. The filter 130 can be coupled to the second hose adapter 136. It is to be appreciated that other types of adapters are contemplated and not outside a scope of the present invention. The first hose adapter 134 can be adapted to couple to the first hose 110 coming from the truckmount carpet cleaner unit 102. The second hose adapter 136 can couple to the second hose 110 having the wand 112 coupled to the other end of the hose 110. The third port 128 can include the third hose adapter 137. The third hose adapter 137 can be operatively coupled to the submersible pump 138 and a waste hose 113. In some embodiments, the third hose adapter 137 may include a check valve to ensure waste does not flow back into the container 120 after exiting.

The waste viewing disposal container 120 can be manufactured from a substantially rigid and transparent material. For instance, plexiglass may be implemented to manufacture the container 120. Typically, the ports 124-128 of the container 120 can include a gasket or similar device for keeping the container 120 substantially airtight. Since the container 120 may be an intermediary between the vacuum motor 108 of the truckmount carpet cleaner unit 102 and the wand 112, suction from the vacuum motor 108 needs to be sustained to allow for the wand 112 to pick up water and debris. As such, the container 120 can be manufactured to minimize or eliminate leaks from the container 120.

The submersible pump 130 can be implemented to pump waste from an interior of the container 120 out of the container 120 to a location determined by a user to be appropriate to dump the waste. A tube or hose can be implemented to run from an output of the submersible pump 130 to the third port 128. The third port 128 can be sealed such that air will not escape the container 120 via the third port 128. In some embodiments, the submersible pump 130 may be configured to pump waste from the container based on a level of the waste in the container 120. In one instance, the float switch 132 can be implemented to start and stop the submersible pump 130. For instance, if the waste reaches a predetermined height, and thus the float switch 132 goes above a predetermined height, the submersible pump 130 may automatically turn on and run for a predetermined amount of time to remove waste from the container 120. In another instance, the submersible pump 130 may run until the float switch gets below a predetermined level. In yet another instance, the submersible pump 130 may be manually started and stopped by a user.

The ports 124-128 can typically be located towards an upper portion of the container 120. The location of the ports 124-128 can help ensure that pressure from the vacuum motor 108 can be maintained inside the container 120. For instance, the submersible pump 130 can be implemented such that waste deposited into the container 120 does not reach a level of the first port 124 and the second port 126. In some embodiments, the first port 124 may be located at a predetermined height from the bottom of the container 120 to allow waste inside the container 120 to exit the third port 128 when reaching a threshold. As can be appreciated, this would allow a user to view the waste being collected before the waste is disposed of.

In one embodiment, the first hose adapter 134 and the second hose adapter 136 can each include a barbed member 150 and an elbow tube 152. The barbed member 150 can typically be located outside the container 120 and the elbow tube 152 can be located inside the container 120. Of note, a gasket or similar type device can be implemented to create a substantially airtight seal between the hose adapters 134, 136 and the container 120. As shown, the elbow tube 152 of the first hose adapter 134 can be oriented upwards and the elbow tube 152 of the second hose adapter 136 can be oriented downwards. Of note, the elbow tube 152 of the first hose adapter 134 can be oriented upwards such that the likelihood of waste in the container 120 exiting through the first port 124 can be substantially minimized. In one instance, the filter 138 can be coupled to the elbow tube 152 of the second hose adapter 136 to catch debris from waste entering the container 120.

The relief valve 140 can be implemented to ensure that the container 120 does not implode if pressure inside the container 120 becomes too great from the vacuum motor 108. In one example, the pressure relief valve 140 can be a vacuum relief valve 140 adapted to open the container 120 to atmosphere to reduce the vacuum pressure inside the container. In one embodiment, the relief valve 140 can be located on top of the container 120.

Figure 3:
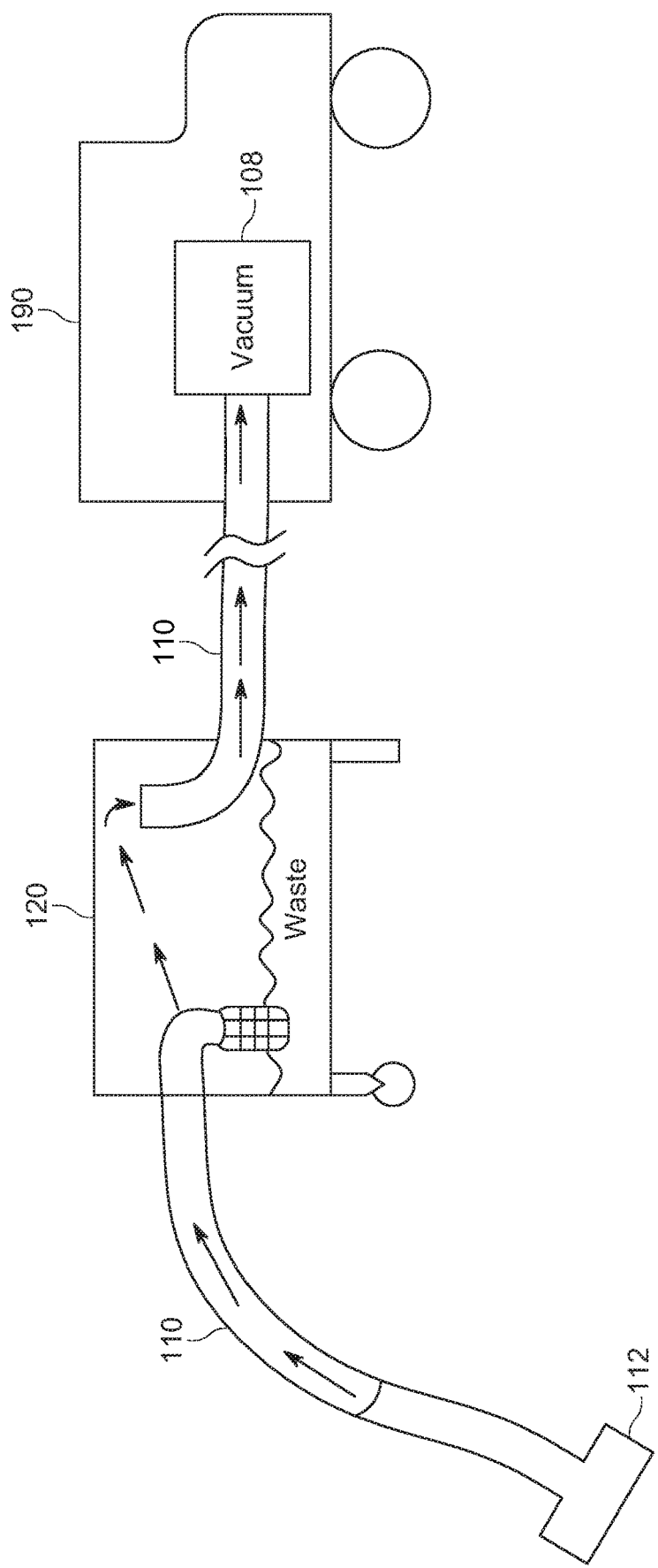
FIG. 3 is a detailed diagram of components of a waste viewing disposal container system according to one embodiment of the present invention.

Referring to FIG. 3, a detailed diagram of the waste viewing disposal container system 100 being implemented is illustrated. As shown, the waste viewing disposal container 120 can be located away from the truckmount carpet cleaner unit 102. The vacuum 108 of the truckmount carpet cleaner unit 102 is shown in a vehicle 190. The hose 110 can be connected between the vacuum 108 and the container 120. The wand 112 can be connected to the container via another hose 110. As previously mentioned, the container 120 can be substantially clear to allow a user to view the waste inside the container as they are cleaning. This can allow the user to make any necessary adjustments to the system 100 while cleaning. Further shown in FIG. 3, is the path air being sucked by the vacuum 108 takes. The air/waste can enter the wand and pass through the hose to the container 120. The waste can be deposited into the container 120, and air can continue on to the vacuum 108 via another hose 110. As shown, the air being sucked can typically be located above the waste in the container 120 such that the waste does not leave the container via the first port 124.

Described hereinafter is one example method (or process) of implementing the waste viewing disposal container system 100.

In a first step, the waste viewing disposal container 120 can be placed inside a building or home having carpets to be cleaned.

In a second step, a first hose 110 can be connected between the vacuum motor 108 and the first port 124 of the container 120.

In a third step, a second hose 110 can be connected to the second port 126 of the container 120 and to a wand 112.

In a fourth step, a first end of the waste hose 113 can be connected to the third port 128 and a second end of the waste hose 113 can be placed proximate a disposal location. For instance, the second end of the waste hose 113 may be placed proximate a drain in the house to be cleaned.

In a fifth step, once all of the hoses have been connected, a user can turn on the truckmount carpet cleaner unit 102 and proceed to clean carpets with the unit 102. Of note, as the user cleans, wasted picked up via the wand 112 can be delivered to the container 120. As the container 120 is being filled with waste, the user can visually analyze the waste being collected to determine if the proper amount of water and/or cleaning agents is being utilized. Of note, the user can actively analyze the waste being collected and make adjustments in real time to ensure maximum efficiency when cleaning.

In a sixth step, the submersible pump 130 can be activated to remove the waste from the container 120 to a proper disposal site.

Alternative Embodiments and Variations

The various embodiments and variations thereof, illustrated in the accompanying Figures and/or described above, are merely exemplary and are not meant to limit the scope of the invention. It is to be appreciated that numerous other variations of the invention have been contemplated, as would be obvious to one of ordinary skill in the art, given the benefit of this disclosure. All variations of the invention that read upon appended claims are intended and contemplated to be within the scope of the invention.

I claim:

1. A waste viewing disposal container adapted to be integrated with a truckmount carpet cleaner unit, the waste viewing disposal container comprising:
a container being manufactured from a substantially rigid and transparent material;
a first port adapted to couple to a first hose, the first hose being connected to a vacuum of the truckmount carpet cleaner unit;
a second port, the second hose being coupled to a wand;
a third port located on a top of the container; and
a submersible pump operatively connected to the third port for removing waste from the container;
wherein the container includes a pair of casters on one bottom end and a pair of adjustable legs on an opposite bottom end.

2. The waste viewing disposal container of claim 1, wherein the container includes a lid.

3. The waste viewing disposal container of claim 1, wherein the submersible pump includes a float switch.

4. The waste viewing disposal container of claim 1, wherein a filter is located (i) proximate the second port, and (ii) inside the container.

5. The waste viewing disposal container of claim 1, wherein a waste hose is coupled to the third port and located outside the container.

6. The waste viewing disposal container of claim 1, wherein the container maintains vacuum pressure when a vacuum motor of the truckmount carpet cleaner unit is activated.

7. The waste viewing disposal container of claim 1, wherein waste is deposited into the container via the second port.

8. The waste viewing disposal container of claim 1, wherein the first port is located on an opposing side of the container from the second port.

9. The waste viewing disposal container of claim 8, wherein the first port and the second port are located approximate an upper ⅓ of the container.

10. The waste viewing disposal container of claim 1, further comprising a relief valve.

11. A combination comprising:
a truckmount carpet cleaner unit including:
an engine;
a vacuum motor;
a first vacuum hose;
a second vacuum hose; and
a wand coupled to the second vacuum hose;
a waste viewing disposal container operatively connected to the truckmount carpet cleaner unit, the waste viewing disposal container including:
a container being manufactured from a substantially rigid and transparent material, the container including a pair of casters on one bottom end and a pair of adjustable legs on an opposite bottom end;
a first port coupled to the first vacuum hose;
a second port coupled to the second vacuum hose;
a third port located on a top of the container; and
a submersible pump operatively connected to the third port for removing waste from the container.

12. The combination of claim 11, wherein the truckmount carpet cleaner unit is adapted to be located inside a vehicle and the waste viewing disposal container is adapted to be located inside a structure when being used.

13. The combination of claim 11, wherein a waste hose is operatively connected to the third port.

14. The combination of claim 11, wherein vacuum pressure is substantially maintained inside the waste viewing disposal container when the vacuum motor is operating.

15. The combination of claim 11, wherein the waste viewing disposal container further includes a relief valve.

16. The combination of claim 11, wherein the first port and the second port each include a hose adapter having a barbed end located outside the container and a tube elbow for a second end located inside the container.

17. The combination of claim 16, wherein the tube elbow of the first port hose adapter is oriented upwards.

18. The combination of claim 16, wherein the tube elbow of the second port hose adapter is oriented downwards.

19. The combination of claim 18, wherein a filter is coupled to the tube elbow of the second port hose adapter.

20. A combination comprising:
a truckmount carpet cleaner adapted to be stored in a vehicle; and
a waste viewing disposal container operatively connected to the truckmount carpet cleaner unit, the waste viewing disposal container adapted to be located inside a structure being cleaned;
the truckmount carpet cleaner unit including:
an engine;
a vacuum motor;
a first vacuum hose;
a second vacuum hose; and
a wand coupled to the second vacuum hose;
the waste viewing disposal container consisting of:
a container being manufactured from a substantially rigid and transparent material;
a first port coupled to the first vacuum hose;
a first hose adapter coupled to the first port, the first hose adapter having a barbed end located outside the container and a tube elbow oriented upwards for a second end located inside the container;
a second port coupled to the second vacuum hose, the second port located on an opposite side of the first port;
a second hose adapter coupled to the second port, the second hose adapter having a barbed end located outside the container and a tube elbow oriented downwards for a second end located inside the container;
a filter directly coupled to the tube elbow of the second hose adapter;
a third port including a hose connector; and
a submersible pump operatively connected to the hose connector for removing waste from the container.

* * * * *